United States Patent
Scott et al.

(10) Patent No.: US 6,694,689 B1
(45) Date of Patent: Feb. 24, 2004

(54) MODULAR FLOORING SYSTEMS AND METHODS

(75) Inventors: Graham Scott, LaGrange, GA (US); David D. Oakey, LaGrange, GA (US)

(73) Assignee: Interface, Inc., Atlanta, GA (US)

(*) Notice: Subject to any disclaimer, the term of this patent is extended or adjusted under 35 U.S.C. 154(b) by 0 days.

(21) Appl. No.: 09/622,072

(22) PCT Filed: Feb. 12, 1999

(86) PCT No.: PCT/US99/03122

§ 371 (c)(1),
(2), (4) Date: Oct. 4, 2000

(87) PCT Pub. No.: WO99/41814

PCT Pub. Date: Aug. 19, 1999

Related U.S. Application Data
(60) Provisional application No. 60/074,654, filed on Feb. 13, 1998.

(51) Int. Cl.$^7$ .............................................. E04B 13/08
(52) U.S. Cl. ........................ 52/392; 52/391; 52/460; 52/764; 52/772
(58) Field of Search ................... 52/390–392, 177, 52/579, 582.1, 220.1–220.3, 126.1, 126.6, 126.5, 126.3, 393, 304 B, 460, 764, 772; 15/217, 161

(56) References Cited

U.S. PATENT DOCUMENTS

| | | | | |
|---|---|---|---|---|
| 2,030,556 A | * | 2/1936 | Veltung | |
| 3,238,682 A | * | 3/1966 | Tracy et al. | |
| 4,361,614 A | * | 11/1982 | Moffitt, Jr. | 428/138 |
| 4,361,925 A | * | 12/1982 | Yamamoto et al. | 15/217 |
| 4,598,510 A | * | 7/1986 | Wagner, III | 52/126.6 |
| 4,656,795 A | * | 4/1987 | Albrecht et al. | 52/126.6 |
| 4,761,926 A | * | 8/1988 | Rea et al. | 52/387 |
| 5,048,242 A | * | 9/1991 | Cline | 52/126.6 |
| 5,114,774 A | * | 5/1992 | Maxim, Jr. | 428/101 |
| 5,293,660 A | * | 3/1994 | Park | 15/160 |
| 5,524,317 A | * | 6/1996 | Nagahama et al. | 15/217 |
| 5,575,034 A | * | 11/1996 | Biernacinski et al. | 15/217 |
| 5,904,015 A | * | 5/1999 | Chen | 52/220.2 |
| 6,093,469 A | * | 7/2000 | Callas | 428/95 |
| 6,311,443 B1 | * | 11/2001 | Allazetta | 52/392 |

* cited by examiner

*Primary Examiner*—Carl D. Friedman
*Assistant Examiner*—Yvonne M. Harton
(74) *Attorney, Agent, or Firm*—Kilpatrick Stockton LLP; John S. Pratt; Kristin L. Johnson

(57) ABSTRACT

Modular flooring systems and methods using at least one free-lay support module. The free-lay support module includes a baseplate and a frame member having a first arm and a second arm that meet and form an angle. Replaceable wear surface modules with or without a backing structure fit within the baseplate. The top of frame partially overlays the replaceable wear surface modules that my be carpet, carpet tile, vinyl flooring, wood flooring, wood parquet flooring or a variety of other materials. In still another embodiment, this invention provides for a free-lay support module that is self-contouring or self-leveling. In yet another embodiment this invention provides a replaceable wear surface modular flooring structure utilizing floor grid members having a "horizontal arm" and a "vertical arm", each of which are in the form of an open U-shaped channel. A trim member has a decorative upper surface and any of a variety of cross-sectional shapes with downward facing members that engage the floor grid members providing a decorative and protective cap on the top of such grid members. In still another embodiment, power systems, communications systems, and/or cable systems reside within the channels.

28 Claims, 4 Drawing Sheets

MODULAR FLOORING SYSTEMS AND METHODS

This application is a 371 of PCT/US99/03122 filed Feb. 12, 1999 which is a provisional No. 60/074,654 filed Feb. 13, 1998.

FIELD OF THE INVENTION

This invention relates in general to the field of carpet and other floor covering, and in particular to modular flooring systems and methods.

BACKGROUND OF THE INVENTION

Traditional floor covering includes carpet, tile, vinyl or other materials that cover a floor or sub-floor. Purchasing, installing and maintaining floor covering requires a major investment in time, labor and material costs. Over time, use wears out a floor covering. In some instances, the existing floor covering is perfectly usable, yet a user wishes to change the appearance of the entire floor covering or perhaps just a section of it because they are no longer satisfied with the color, design or other attributes of their carpet or floor covering. However, due to the investment in the floor covering, users may experience reluctance in replacing unworn carpet.

Replacing only a portion of the floor covering or only the wear surfaces would solve this problem. Yet currently, changing patterns and colors requires complete or substantial replacement of the existing floor covering. Blending old and new floor covering patterns and colors may prove difficult.

Additionally, renovations to floor covering in offices and other spaces requires removal of existing floor covering and/or placement of the new floor covering on top of the existing floor covering. Height concerns arise when a new floor covering is placed on top of an existing one. Further, maintaining an overall level floor becomes a concern when a new floor covering is placed over one that is worn.

Therefore, a need exists for modular flooring systems and methods that is modular and interchangeable.

SUMMARY OF THE INVENTION

This invention includes a modular flooring device including a baseplate, and a frame member attached to the baseplate and having a first arm and a second arm integrally attached to the first arm. The device is configured to support a replaceable wearing surface disposed within a recess formed between a lip of the upper portion of the frame and the baseplate.

An alternative embodiment of this invention is a self-contouring modular flooring device, including a first baseplate having a frame member attached to the baseplate and having a first arm and a second arm integrally attached to the first arm forming substantially a right angle, and a second baseplate movably attached to the first baseplate. Another embodiment is a self-contouring flooring device that includes a flexible baseplate and a frame member integrally attached to the flexible baseplate and having a first arm and a second arm attached to the first arm forming substantially a right angle whereby the flexible baseplate contours to an underlying floor.

Still another embodiment of this invention is a replaceable wear surface modular flooring, including at least one base module having a baseplate, floor grid members having a first arm and a second arm, each of which is formed as an open channel and attached on adjacent edges of the baseplate, and a trim member having a decorative upper surface engaging the floor grid members.

In yet another alternative embodiment of this invention is a method for providing a wear surface modular flooring structure that includes creating a floor covering structure by placing at least one baseplate on a floor surface, and inserting a wear surface on the baseplate.

Another embodiment of the invention is a method for providing a wear surface modular flooring structure that includes inserting at least one floor module having a removable trim member positioned over a channel, and placing a wear surface on the floor module. Power header or cables and/or communications headers or cables may be placed in the channels with branches from these headers running in the channels providing for use in a middle region of the flooring structure.

Objects of this invention include:

To provide systems and methods for a flooring structure that is modular and interchangeable.

To provide systems and methods for a flooring structure that replaces certain raised floor systems that utilizes more slab to slab distance.

To provide systems and methods for a flooring structure that provides many design options.

To provide systems and methods for a flooring structure that utilizes sustainable materials.

To provide systems and methods for a flooring structure that presents no height concerns.

To provide systems and methods for a flooring structure that facilitates efficient and economic renovation of poor office or other spaces.

To provide systems and methods for a flooring structure that permits extended product life by replacement of only the wear surfaces.

To provide systems and methods for a flooring structure that enables recycle materials to be used and avoids recycling problems.

As the following description and accompanying drawings make clear, these and other objects are achieved by this invention.

DETAILED DESCRIPTION OF THE INVENTION

The attached drawing FIGS. 1–10 depict alternative embodiments of a new modular flooring system utilizing a base and a framing member or members. Replaceable wear surfaces, such as modular carpet, carpet-like or other flooring components, are placed on the base and held in position by the framing members.

Figure 1:
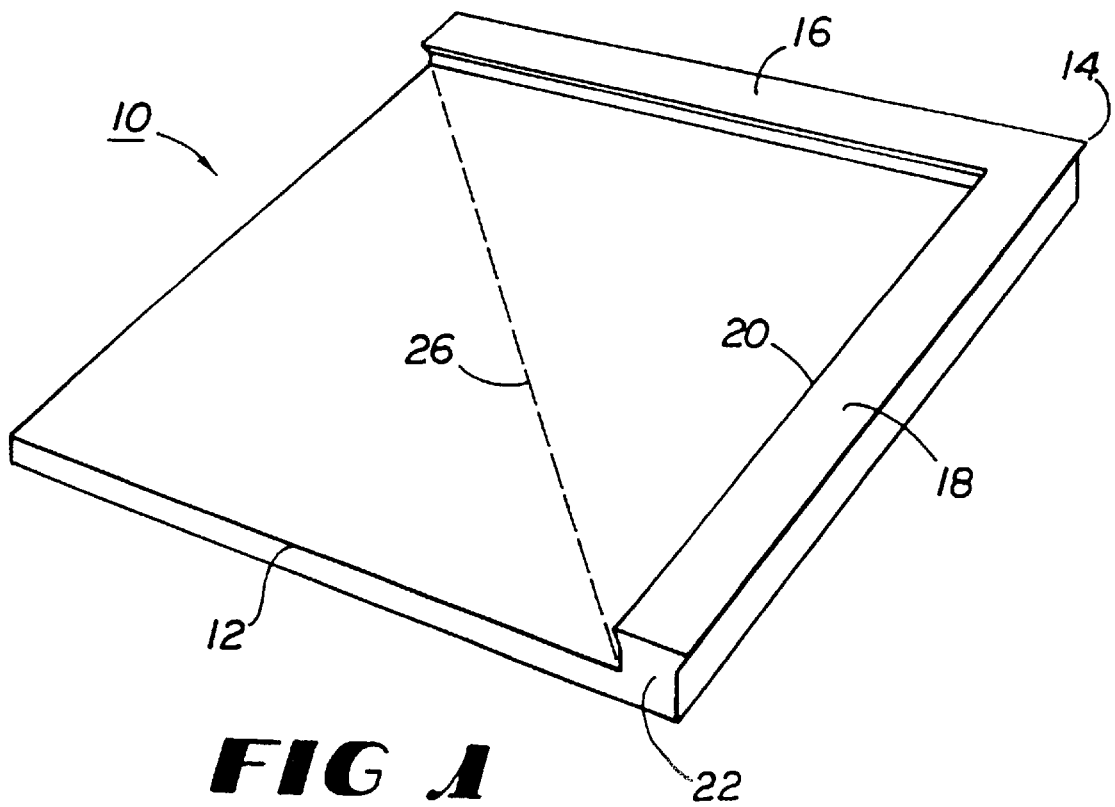
FIG. 1 shows a perspective view of a free-lay support module of the modular flooring system of this invention.

In a first alternative embodiment of this invention shown in FIG. 1, a free-lay support module 10 that is generally square or rectangular includes a baseplate 12 and a frame member 14 having a first arm 16 and a second arm 18 integrally formed and meeting at an angle. In one embodiment, the frame member is structured to resemble a "horizontal" arm 16 and a "vertical" arm 18 in a plane parallel to the baseplate 12 with the two arms meeting to form a right angle. The cross-sectional shape of frame 14 is a wedge that is widest on the top 20 of frame 14 and narrows in the region of attachment 22 to base 12. This shape allows the top 20 of frame 14 partially to overlie replaceable wear surface modules 24 that may be carpet, carpet tile, vinyl flooring, wood flooring, wood parquet flooring or a variety of other materials.

Figure 2:
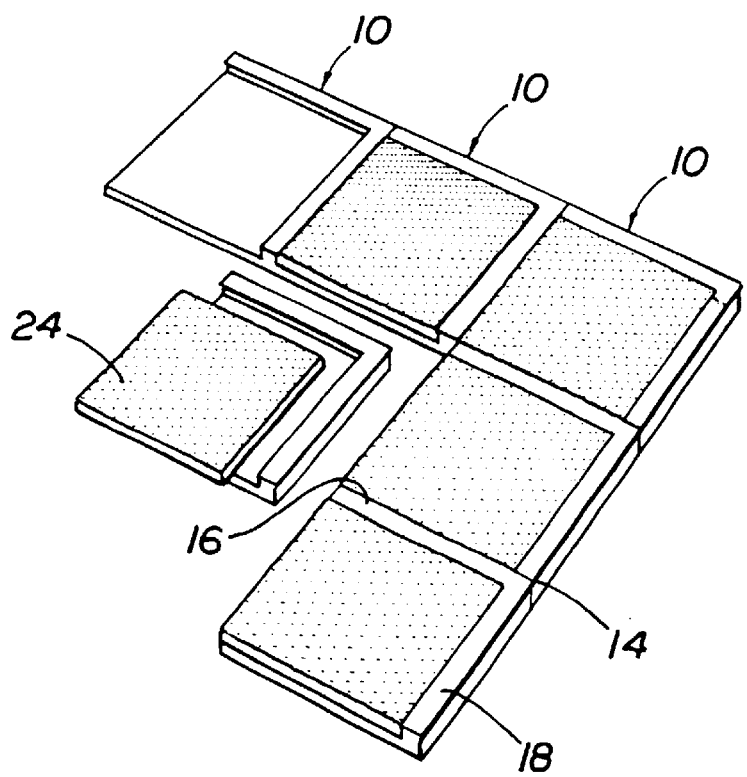
FIG. 2 shows a perspective view of a plurality of the free-lay support modules of FIG. 1 including a replaceable wear surface and positioned together as a flooring surface.

As will be appreciated by reference to FIG. 2, a plurality of free-lay support modules 10 may be positioned on a floor or subfloor surface in "rows" and "columns," with the result that wear surface modules 24 will be entirely surrounded by arms 16 and 18 of frame members 14, thereby providing an attractive and versatile flooring with replaceable wear surfaces, which flooring may be quickly installed. Friction between the wear surface modules 24 and top 20 of the frame 14 permit the plurality of free-lay support modules 10 to remain locked into position when a downward force is exerted on the support module 10, such as a user walking on the flooring surface.

In a second, self-contouring embodiment of the free-lay support module flooring described above and depicted in FIGS. 1 and 2, base 12 may be made in two pieces divided along a diagonal suggested by broken line 26 in FIG. 1. The two triangular halves of base 12 are then hinged together in any of a variety of appropriate manners, including the use of conventional metal strap or other hinges, bridging fabric affixed with glue or otherwise to each half of base 12. The modules may rest on small pads of feet for self leveling that is particularly useful for the hinged environment. The corner of one triangle remote from the hinge line 26 and all three corners of the other triangle may rest on the small pads of feet (not shown). The thus-provided ability of base 12 to articulate modestly along the hinge line indicated by broken line 26, combined with the described pads, will permit base 12 to conform to modest irregularities in a floor or subfloor of the type that are frequently encountered in concrete subfloors in office and light industrial buildings. This will permit the replaceable wear surface flooring system depicted in FIGS. 1 and 2 to be self-leveling.

As an alternative means for providing a self-contouring flooring, base 12 depicted in FIG. 1 can be a flexible material so that it naturally "drapes" or contours itself to the underlying subfloor.

Figure 3:
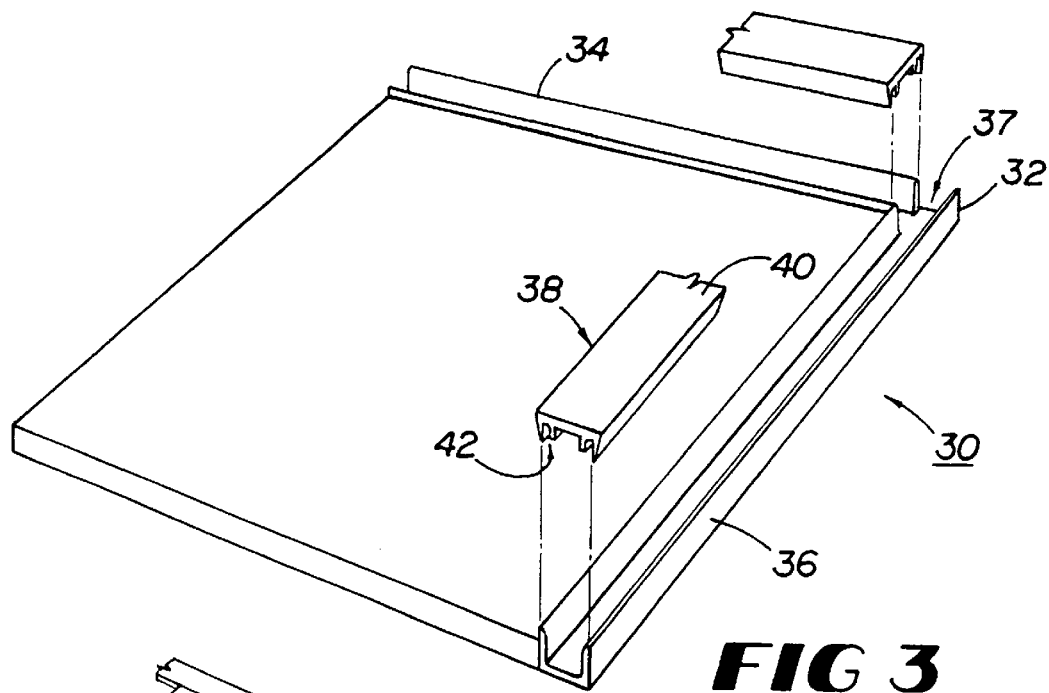
FIG. 3 shows a perspective view of an alternative embodiment of the free-lay support module with trim members.

Yet another embodiment of this invention is depicted in FIGS. 3 through 9. FIG. 3 shows a replaceable wear surface modular flooring structure 30 that is provided utilizing floor grid members 32 that have a first arm 34 and a second arm 36, each of which are in the form of an open U-shaped channel 37. A trim member 38 has a decorative upper surface 40 and any of a variety of cross-sectional shapes with downward facing members 42 that engage grid members 32 to provide a decorative and protective cap on the top of such grid members. The trim member 38, in particular the downward facing members 42, may contain teeth or detents that releasably engage as co-pending teeth or detents on the grid members 32.

Figure 4:
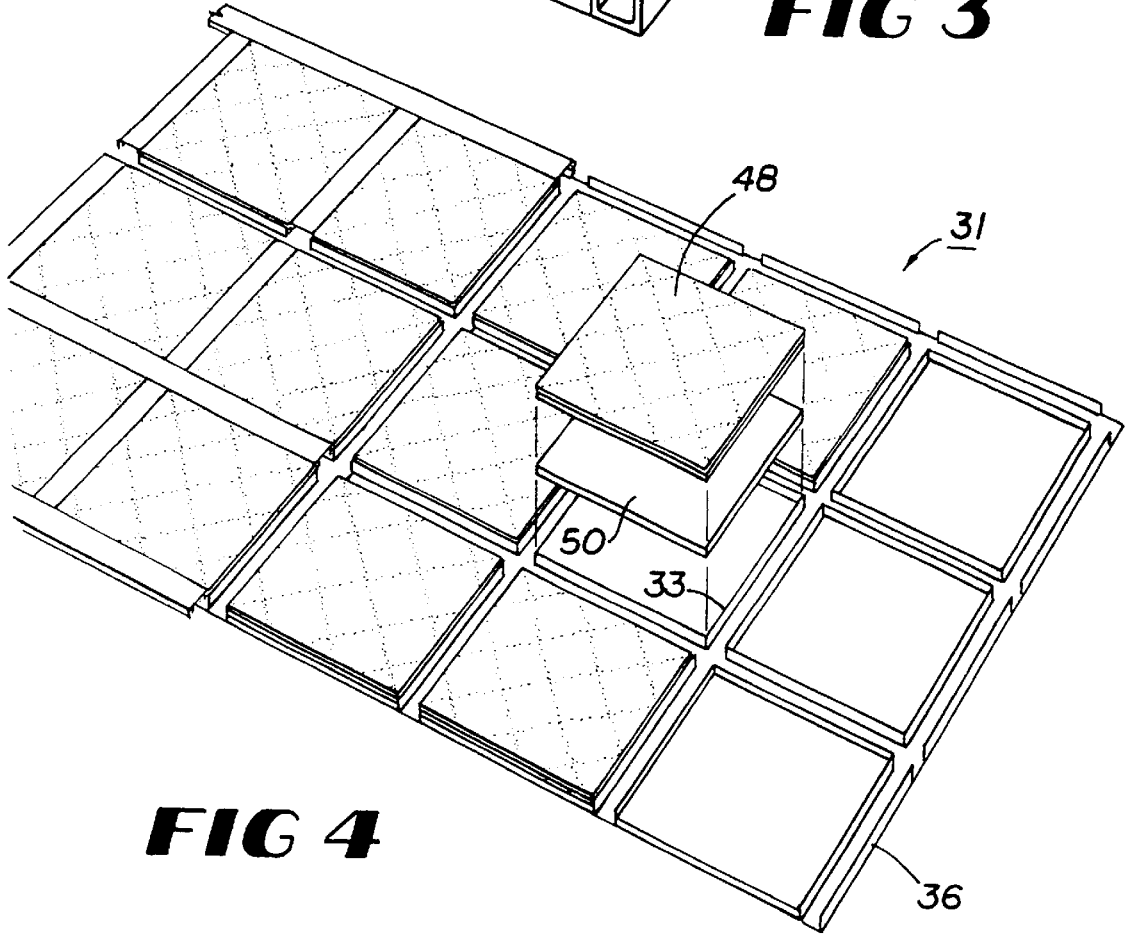
FIG. 4 shows a perspective view of a plurality of the free-lay support modules of FIG. 3 including a replaceable wear surface and positioned together as a flooring surface.

Although the channels 36 depicted in FIG. 3 are shown as unitary members of a single right angle structure, parallel channels 36 in a particular flooring structure 31 could run the entire length or width of the room, as shown in FIG. 4. In this figure, the flooring structure 30 includes transverse channels equal in length to the side of a single module filling in between the parallel, longer channels. A wear surface 48 and an optional underlay or backing structure 50 fitting within the flooring structure 30 are shown in FIG. 4. The wear surface 48 and the backing structure 50 are positioned flush against an interior 33 of the floor grid member.

Figure 5:
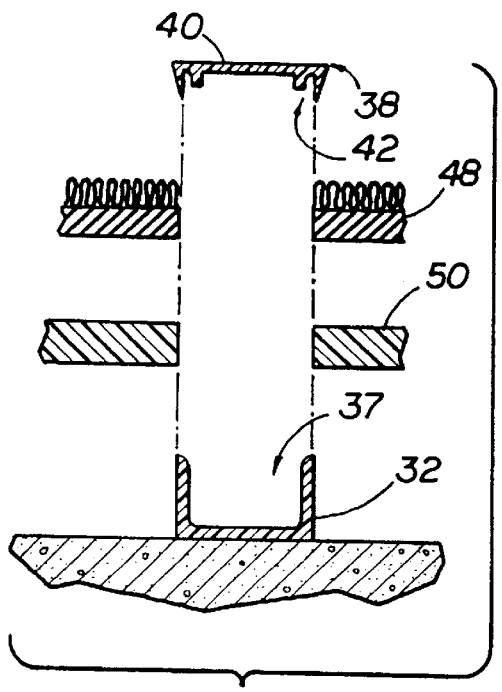
FIG. 5 shows an exploded cross-sectional view of a free-lay support module having a wearable surface, trim member, grid member and an underlay.

FIG. 5 shows an exploded cross-sectional view of the wearable surface 48, trim member 38, grid member 32 and an underlay or backing structure 50 of the free-lay support module 30. As shown in FIG. 5, the trim member 38 attaches to the grid member 32. In this embodiment, friction between the trim member 38 and the grid member 32 adheres the two pieces together.

Figure 6:
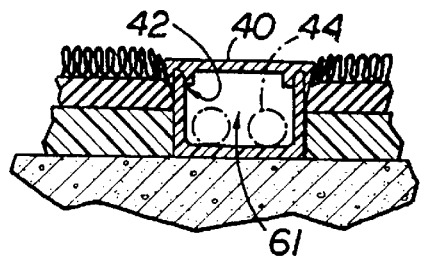
FIG. 6 shows a cross-sectional view of the free-lay support module of FIG. 5 having a passageway for a communications system.
Figure 8:
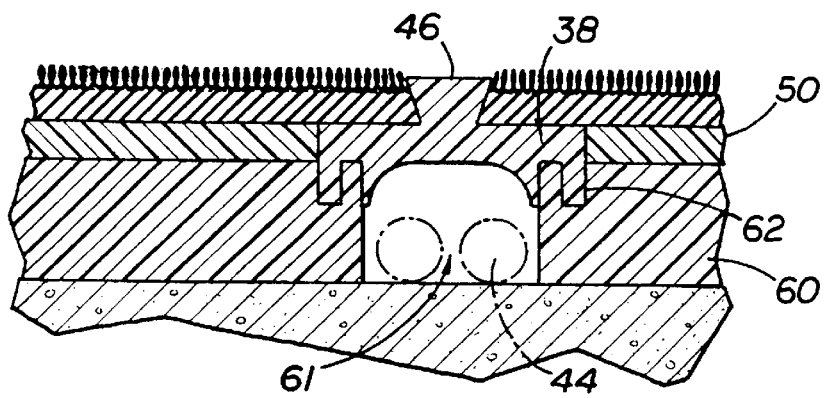
FIG. 8 shows a cross-sectional view of an alternative embodiment of the trim members of the modular flooring system of FIG. 6.
Figure 9:
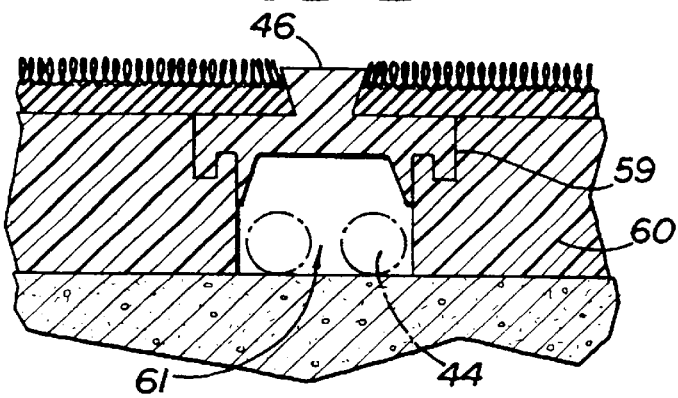
FIG. 9 shows a cross-sectional view of an alternative embodiment of the modular flooring system of FIG. 8 where the flooring system is without an underlay.

As will be appreciated, in particular, by reference to FIGS. 6, 8 and 9, the above-described construction provides intersecting channels through which cables and wiring 44 may be run. FIG. 6 shows a cross-sectional view of the free-lay support module 30 of FIG. 5 having a passageway or chase 61 for a communications cable system or wiring 44. Such cables and wiring 44 may be easily accessed simply by removing appropriate portions of trim member 38.

Figure 7:
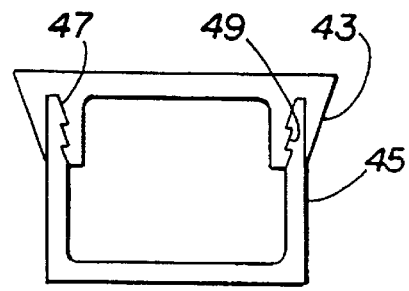
FIG. 7 shows a cross-sectional view of an alternative embodiment of the trim member and channel of FIG. 6 where the trim member and channel have mating teeth.

FIG. 7 shows an alternative embodiment of a trim member 43 and a grid member 45. Teeth 47 on the trim member 43 mate with teeth 49 on the grid member 45. This arrangement provides an alternative locking mechanism for adhering the trim member 43 to the grid member 45.

As will be appreciated, the top of trim in all embodiments may have a variety of shapes. FIG. 8 illustrates one such shape and shows a cross-sectional shape of a dovetail 46 clearly depicted in FIG. 8. Such a dovetail 46 shape provides particularly attractive and effective framing structure for modular flooring wear surfaces 48 that may be carpet, carpet tile, fabric, vinyl flooring, wood and a wide variety of other materials. Each wear surface 48 may rest on top of a separate pad or backing structure 50. This multi-component construction permits portions of the flooring, such as the wear surface 48, to be replaced without replacement of underlying layers that contribute to the under-foot and other characteristics of the flooring 31.

As will be appreciated by reference to FIGS. 8 and 9, trim members 38 and 59 may engage base modules 60 directly by fitting rabbets 62 in the base module. In this instance, separate channels are not needed, and the trim strips 38 cooperate with base modules 60 to form cable chases 61.

The trim 38 can be produced from a wide variety of different materials, including aluminum and other metals and relatively hard plastics such as extruded polyvinyl chloride, pultruded fiber reinforced plastics, polyethylene or a "wood flour" material. The strips can also be made of solid wood, plywood or other wood veneer structures.

FIG. 9 shows a cross-sectional view of an alternative embodiment of the modular flooring system of FIG. 8 where the flooring system 30 is without an underlay or backing structure 50. Additionally, the trim member 59 has a underside with a varied shaped from the trim member 38 of FIG. 8.

Figure 10:
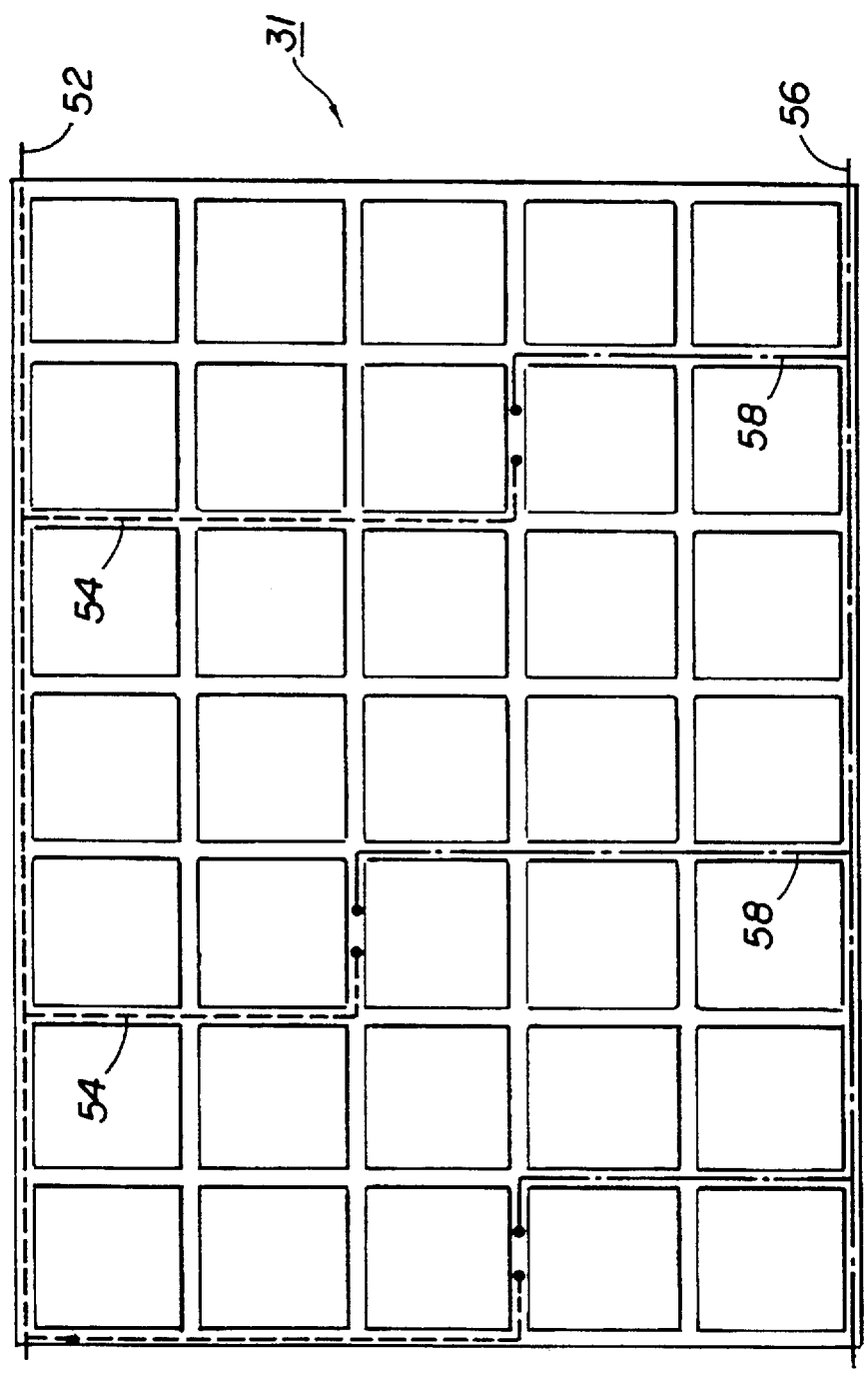
FIG. 10 shows a top plan schematic view of a flooring made from the flooring structures of FIGS. 6–9.

FIG. 10 shows a top plan schematic view of flooring structure 31 of this invention, having a power header or cable 52 running horizontally as indicated at the top of FIG. 10 and power or cable branches 54 running in the channels 32 to locations for use in the middle region of the floor. A power header 52 is a power source, preferably a cylindrically shaped insulated conductor having distribution branches connected thereto. A communications header or cable provides for distributing telecommunications access throughout the flooring structure 31. The communications header or cable 56 may run horizontally at the bottom of FIG. 10, with branches 58 that run up to locations for use in the middle of the room. This avoids routing power and communications cables side-by-side.

In another embodiment of this invention, power, communications or other cables can be permanently installed in flooring modules and interconnected when the modules are installed. Moreover, flooring modules could be manufactured with built in computer chips and sensors to provide a variety of functions such as temperature or load sensing.

Among numerous other benefits of this invention, as will be readily appreciated by those skilled in the art, it is possible utilizing the components described above to provide an attractive and highly functional floor utilizing carpet or carpet tile type components that are not bonded to each other, thereby facilitating replacement of soiled or worn components without the need for replacement of all components in the flooring system. This further facilitates recycling of the materials of the system, because dissimilar materials are not incorporated in the same structure.

An advantage of this invention is that it can utilize sustainable materials.

Another advantage is that this invention is modular and interchangeable.

Yet another advantage of this invention is that it can replace some raised floor systems that utilize more slab to slab distance.

Still another advantage of this invention is that it provides for many floor covering design options.

Another advantage of this invention is that it presents no floor covering height concerns.

Yet another advantage of this invention is that it facilitates renovation of poor office or other spaces.

Another advantage of this invention is that it permits extended product life by replacement of only the wear surfaces.

Still another advantage of this invention is that it enables recycle materials to be used and avoids recycling problems.

While certain embodiments of this invention have been described above, these descriptions are given for purposes of illustration and explanation. Variations, changes, modifications and departures from the systems and methods disclosed above may be adopted without departure from the spirit and scope of this invention.

What is claimed is:

1. A modular flooring device, comprising:
   a) a baseplate having outer edges; and
   b) a frame member fixedly attached to the baseplate and having
       a first arm and a second arm integrally attached to the first arm, wherein each of the first and second arms extends at least partially along an outer edge of the baseplate and substantially parallel to the outer edge of the baseplate along which each of the first and second arms extends;
       an upper portion; and
       a lower portion having a width less than the upper portion.

2. A modular flooring device, comprising:
   a) a baseplate; and
   b) a frame member fixedly attached to the baseplate and having
       i. a first arm and a second arm integrally attached to the first arm, wherein the first and second arms each extend at least partially along and substantially parallel to an outer edge of the baseplate; and
       ii. a narrow region and a wide region, wherein the narrow region has a width less than the wide region and wherein the narrow region is proximal the baseplate and the wide region is distal the baseplate.

3. A modular flooring device, comprising:
   a) a baseplate;
   b) a frame member attached to the baseplate and having a first arm and a second arm integrally attached to the first arm,
       an upper portion; and
       a lower portion having a width less than the upper portion; and
   c) a replaceable wearing surface disposed within a recess formed between a lip of the upper portion of the frame member and the baseplate.

4. The device of claim 3 further comprising a plurality of baseplates positioned such that each baseplate abuts another and forming a floor covering.

5. A self-contouring modular flooring device, comprising:
   a) a first baseplate having a frame member attached to the baseplate and having a first arm and a second arm integrally attached to the first arm forming substantially a right angle; and
   b) a second baseplate movably attached to the first baseplate,
   wherein the first and second baseplate are formed in a triangular shape.

6. A self-contouring modular flooring device, comprising:
   a) a first baseplate having a frame member attached to the baseplate and having a first arm and a second arm integrally attached to the first arm forming substantially a right angle; and
   b) a second baseplate movably attached to the first baseplate,
   wherein the first and second baseplates are attached together by a hinge that allows one baseplate to move relative to the other.

7. The device of claim 6 wherein the hinge is a metal strap.

8. The device of claim 6 wherein the first and second baseplates are hinged together using a bridging fabric affixed with an adhesive to each baseplate.

9. A self-contouring modular flooring device, comprising:
   a) a first baseplate having a frame member attached to the baseplate so that the frame member at least partially extends from an upper surface of the first baseplate, wherein the frame member comprises a first arm and a second arm integrally attached to the first arm forming substantially a right angle;
   b) a second baseplate movably attached to the first baseplate; and
   c) pads attached to the first and second baseplates on a side of the first and second baseplates that faces a floor whereby the joined first and second baseplates conform to irregularities in the floor permitting the device to self-level.

10. A self-contouring modular flooring device, comprising:
   a) a first baseplate having a frame member attached to the baseplate so that the frame member at least partially extends from an upper surface of the first baseplate, wherein the frame member comprises a first arm and a second arm integrally attached to the first arm forming substantially a right angle; and b) a second baseplate movably attached to the first baseplate; and c) a replaceable wear surface disposed on a surface created when the first baseplate and the second baseplate are substantially coplanar.

11. A self-contouring flooring device, comprising:

a) a flexible baseplate; and b) a frame member integrally attached to the flexible baseplate and having:
  i) a wide region distal the baseplate;
  ii) a narrow region proximal the baseplate and having a width less than the wide region;
  iii) a first arm; and
  iv) a second arm attached to the first arm forming substantially a right angle, whereby the flexible baseplate contours to an underlying floor.

12. The device of claim 11 further comprising a wear surface disposed on the flexible baseplate.

13. The device of claim 12 further comprising a backing surface disposed between the wear surface and the flexible baseplate.

14. A replaceable wear surface modular flooring comprising at least one base module having:

a) a baseplate having edges and a baseplate bottom surface for positioning on an underlying flooring surface;

b) a floor grid member having a first arm and a second arm attached on adjacent edges of the baseplate, wherein each of the first and second arm extends substantially parallel to the edge of the baseplate to which it is attached and wherein each of the first and second arm is formed as an open U-shaped channel defined by two side walls and a bottom wall, wherein the bottom wall of the U-shaped channel is substantially coplanar with the baseplate bottom surface and wherein the U-shaped channel opens upwardly when the baseplate is positioned on the underlying flooring surface;

c) a trim member, having a decorative upper surface and engaging the U-shaped channel of at least one of the first and second arms; and d) a replaceable wear surface positioned on the baseplate.

15. The replaceable wear surface modular flooring of claim 14 further comprising:

a) teeth or detents on the trim member; and b) mating teeth or detents on the grid member for locking the trim member to the grid member.

16. The replaceable wear surface modular flooring of claim 14 further comprising:

a) a backing structure positioned on the baseplate; and b) wear surface disposed on the backing structure.

17. The replaceable wear surface modular flooring of claim 14 comprising a plurality of base modules.

18. The replaceable wear surface modular flooring of claim 17 further comprising a wear surface comprising carpet and positioned on the baseplate.

19. The replaceable wear surface modular flooring of claim 17 further comprising a wear surface comprising tile and positioned on the baseplate.

20. A replaceable wear surface modular flooring, comprising at least one base module having:

a) a baseplate having edges;

b) a floor grid member having a first arm and a second arm attached on adjacent edges of the baseplate, wherein each of the first and second arm extends substantially parallel to the edge of the baseplate to which it is attached and wherein each of the first and second arm is formed as an open channel; and c) a trim member, having a decorative upper surface, engaging the floor grid member, wherein the trim member is adapted to dovetail with a fitting rabbet.

21. A replaceable wear surface modular flooring comprising at least one base module having:

a) a baseplate having edges;

b) a floor grid member having a first arm and a second arm attached on adjacent edges of the baseplate, wherein each of the first and second arm extends substantially parallel to the edge of the baseplate to which it is attached and wherein each of the first and second arm is formed as an open channel; and c) a trim member, having a decorative upper surface, engaging the floor grid member; and d) a chase between the trim member and the grid member.

22. The replaceable wear surface modular flooring comprising:

a) a plurality of base modules, each having:
  i) a baseplate having edges;
  ii) a floor grid member having a first arm and a second arm attached on adjacent edges of the baseplate, wherein each of the first and second arm extends substantially parallel to the edge of the baseplate to which it is attached and wherein each of the first and second arm is formed as an open channel; and
  iii) a trim member, having a decorative upper surface, engaging the floor grid member; and b) a power header operatively connected to the base modules; and c) power cable branches disposed within the channels.

23. The replaceable wear surface modular flooring comprising:

a) a plurality of base modules, each having:
  i) a baseplate having edges;
  ii) a floor grid member having a first arm and a second arm attached on adjacent edges of the baseplate, wherein each of the first and second arm extends substantially parallel to the edge of the baseplate to which it is attached and wherein each of the first and second arm is formed as an open channel; and
  iii) a trim member, having a decorative upper surface, engaging the floor grid member; and b) a communications header operatively connected to the base module; and c) communications cable branches disposed within the channels.

24. A method for providing a wear surface modular flooring structure comprising:

a) creating a floor covering structure by placing at least one modular flooring device on a floor surface, wherein the modular flooring device comprises (i) a baseplate and (ii) a frame member attached to the baseplate and having a wide region distal the baseplate, a narrow region proximal the baseplate and having a width less than the wide region, a first arm, and a second arm integrally attached to the first arm; and b) inserting a wear surface on the baseplate.

25. A method for providing a wear surface modular flooring structure comprising:

a) positioning at least one substantially planar floor module having a removable trim member positioned over a channel on an underlying flooring surface; and b) placing a wear surface on the floor module.

26. The method of claim 25 further comprising placing a backing surface between the wear surface and the floor module.

27. A method for providing a wear surface modular flooring structure comprising:

a) positioning at least one substantially planar floor module having a removable trim member positioned over a channel on an underlying flooring surface;

b) placing a wear surface on the floor module;

c) inserting a power header on one portion of the floor module; and d) inserting cable branches within a vertical channel of the floor module.

28. The method of claim 27 further comprising:

a) inserting a communications header on another portion of the floor module; and b) inserting communications branches within an different vertical channel of the floor module.

* * * * *